United States Patent
Deb et al.

(10) Patent No.: US 8,861,370 B2
(45) Date of Patent: Oct. 14, 2014

(54) SYSTEM AND METHOD FOR TESTING A COMMUNICATIONS NETWORK HAVING A CENTRAL BUS GUARDIAN (CBG) TO DETECT A FAULTY CONDITION ASSOCIATED WITH THE CBG

(75) Inventors: Abhijit Kumar Deb, Eindhoven (NL); Sujan Pandey, Eindhoven (NL); Hubertus Gerardus Hendrikus Vermeulen, Eindhoven (NL)

(73) Assignee: NXP B.V., Eindhoven (NL)

( * ) Notice: Subject to any disclaimer, the term of this patent is extended or adjusted under 35 U.S.C. 154(b) by 486 days.

(21) Appl. No.: 13/238,568

(22) Filed: Sep. 21, 2011

(65) Prior Publication Data
US 2013/0070613 A1     Mar. 21, 2013

(51) Int. Cl.
*H04L 12/28*     (2006.01)
*H04L 12/26*     (2006.01)
*H04L 12/40*     (2006.01)

(52) U.S. Cl.
CPC .......... *H04L 12/40026* (2013.01); *H04L 43/50* (2013.01)
USPC ............................ 370/241; 370/489; 710/316

(58) Field of Classification Search
None
See application file for complete search history.

(56) References Cited

U.S. PATENT DOCUMENTS

| | | | |
|---|---|---|---|
| 8,004,993 B2 * | 8/2011 | Angelow | 370/240 |
| 2005/0283681 A1 * | 12/2005 | Jeddeloh | 714/42 |
| 2009/0086653 A1 * | 4/2009 | Driscoll et al. | 370/258 |
| 2009/0122812 A1 * | 5/2009 | Steiner et al. | 370/503 |
| 2010/0220744 A1 * | 9/2010 | Ungermann et al. | 370/458 |

FOREIGN PATENT DOCUMENTS

| | | |
|---|---|---|
| WO | 01/30028 A2 | 4/2001 |
| WO | 2006/067673 A2 | 6/2006 |

OTHER PUBLICATIONS

FlexRay Communications System Protocol Specification, ver 2.1, Rev E, FlexRay consortium, [Online], http://www.flexray.com (as of Dec. 22, 2010).

FlexRay Communications System Preliminary Central Bus Guardian Specification, ver 2.0.9, FlexRay consortium, [Online], http://www.flexray.com (as of Dec. 22, 2010).

Extended European Search Report for European Patent Appln. No. 12181346.3 (Jan. 2, 2013).

* cited by examiner

Primary Examiner — Bob Phunkulh

(57) ABSTRACT

Systems and methods for testing a communications network having a central bus guardian (CBG) to detect a faulty condition associated with the CBG are described. In one embodiment, a method for testing a communications network having a CBG to detect a faulty condition associated with the CBG includes supplying a communications schedule to the CBG, causing test data to be transmitted between different buses that are connected to the CBG according to the communications schedule, and determining the faulty condition associated with the CBG based on whether or not the test data is received according to the communications schedule. Other embodiments are also described.

18 Claims, 5 Drawing Sheets

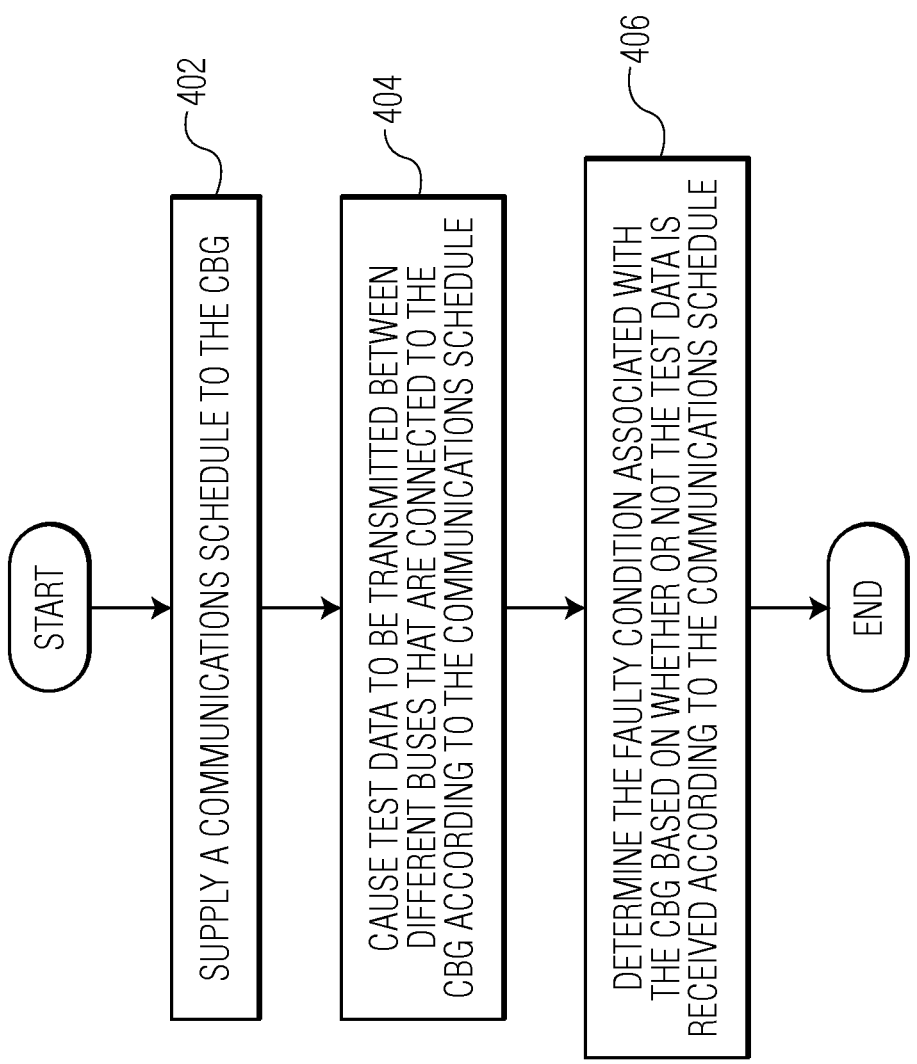

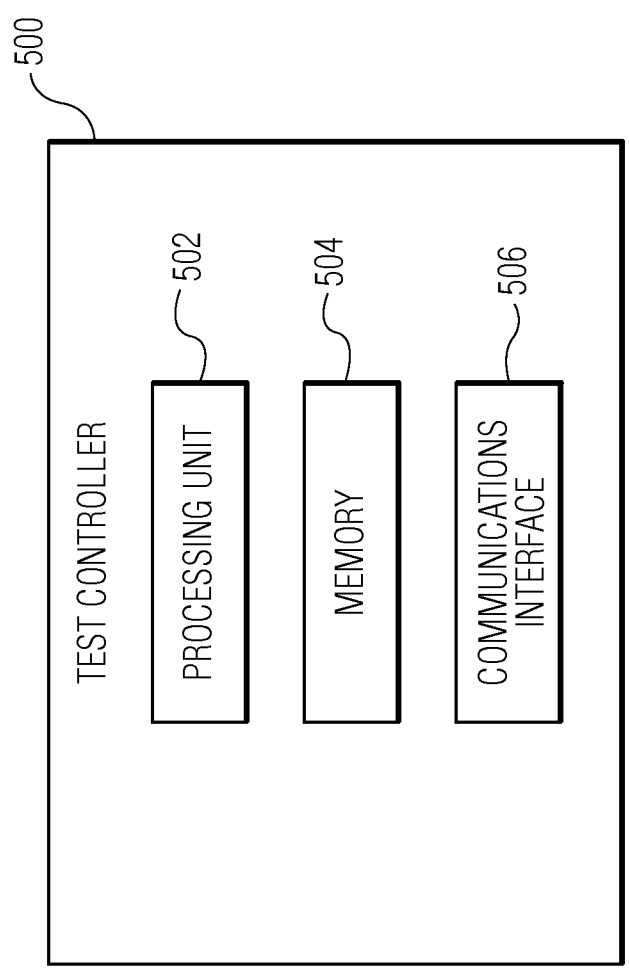

SYSTEM AND METHOD FOR TESTING A COMMUNICATIONS NETWORK HAVING A CENTRAL BUS GUARDIAN (CBG) TO DETECT A FAULTY CONDITION ASSOCIATED WITH THE CBG

Embodiments of the invention relate generally to systems and methods for testing an electronic system and, more particularly, to systems and methods for testing a communications network having a central bus guardian (CBG).

A CBG is a communications hub device that can be used to improve to the robustness of data communications. For example, a CBG can connect communications nodes in an automobile system to improve the robustness of safety critical communications of the automobile system. However, the CBG itself and the interconnections between the CBG and the communications nodes in the automobile system may be faulty. When the CBG is faulty, instead of guarding the automobile system against errors, the CBG itself may introduce errors. To make the automobile system more robust, erroneous run time behavior of the CBG and the broken connectivity between the CBG and the communications nodes in the automobile system needs to be detected.

Systems and methods for testing a communications network having a CBG to detect a faulty condition associated with the CBG are described. In one embodiment, a method for testing a communications network having a CBG to detect a faulty condition associated with the CBG includes supplying a communications schedule to the CBG, causing test data to be transmitted between different buses that are connected to the CBG according to the communications schedule, and determining the faulty condition associated with the CBG based on whether or not the test data is received according to the communications schedule. Other embodiments are also described.

In an embodiment, a system for testing a communications network having a CBG to detect a faulty condition associated with the CBG includes a test controller configured to supply a communications schedule to the CBG, cause test data to be transmitted between different buses that are connected to the CBG according to the communications schedule, and determine the faulty condition associated with the CBG based on whether or not the test data is received according to the communications schedule.

In an embodiment, a method for testing a communications network having a FlexRay-compatible CBG to detect a faulty condition associated with the FlexRay compatible CBG includes supplying a communications schedule to the FlexRay-compatible CBG, causing test data to be transmitted between different buses that are connected to the FlexRay compatible CBG according to the communications schedule, and determining the faulty condition associated with the FlexRay-compatible CBG based on whether or not the test data is received to according to the communications schedule.

Other aspects and advantages of embodiments of the present invention will become apparent from the following detailed description, taken in conjunction with the accompanying drawings, depicted by way of example of the principles of the invention.

FIG. 4 is a process flow diagram of a method for testing a communications network having a CBG to detect a faulty condition associated with the CBG in accordance with an embodiment of the invention.

FIG. 5 depicts an embodiment of a test controller depicted in FIG. 1.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be to realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
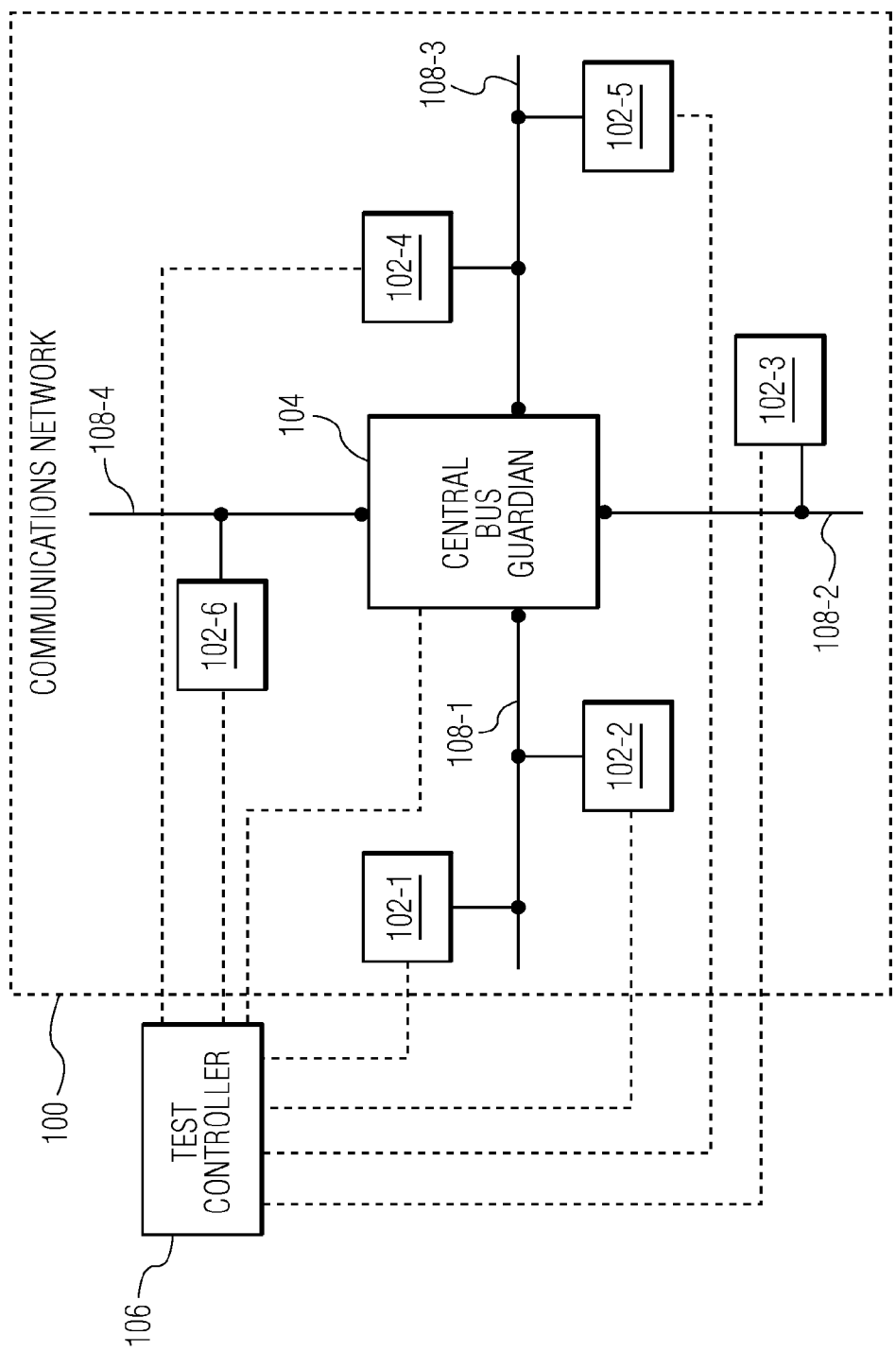
FIG. 1 is a schematic block diagram of a communications network in accordance with an embodiment of the invention.

FIG. 1 is a schematic block diagram of a communications network 100 in accordance with an embodiment of the invention. The communications network can be used for various applications. In an embodiment, the communications network is used for an automotive application. Examples of automotive applications include, without limitation, vehicle dynamics such as braking, suspension, steering, driver assistance, intelligent parking assist, adaptive cruise control, fuel control, traction control, intelligent power assisted steering, lane departure warning, electronic power assisted steering and electronic stability control. For example, the communications network facilitates communications among communications devices such as electronic controller nodes in an automobile system, which may be located within a single vehicle or distributed across multiple vehicles.

In the embodiment depicted in FIG. 1, the communications network 100 includes communications devices 102-1, 102-2, 102-3, 102-4, 102-5, 102-6 to and a central bus guardian (CBG) 104. The communications network is configured to facilitate data communications (e.g., safety critical data communications) among the communications devices. Although the communications network is shown in FIG. 1 as including six communications devices, in some other embodiments, the communications network includes more than six communications devices or less than six communications devices. In addition, although the communications network is shown in FIG. 1 as including only one CBG, in some other embodiments, the communications network includes multiple CBGs.

The communications devices 102-1, 102-2, 102-3, 102-4, 102-5, 102-6 of the communications network 100 are configured to transmit and receive data. In addition to communications, each of the communications devices may be configured to perform an additional function. For example, each of the communications devices may be used to perform an automotive application. The data transmitted and received by the communications devices can be in any suitable format. In an embodiment, the data transmitted and received are data frames. A data frame may include a header segment, a payload segment used to convey application data, and a trailer segment. In an embodiment, the communications devices are electronic controller nodes in an automobile system. An electronic controller node may contain an electronic control unit (ECU), to which sensors and actuators are connected. The ECU typically collects data from the sensors, runs an application software, controls the actuators, and communicates to other electronic controller nodes via the communications network.

The CBG 104 of the communications network 100 is configured to selectively block and selectively forward data received on branches/buses of the communications network that are connected to the CBG 104. In the embodiment depicted in FIG. 1, the CBG 104 is connected to four buses 108-1, 108-2, 108-3, 108-4 of the communications network. In addition, the communication devices 102-1, 102-2, 102-3, 102-4, 102-5, 102-6 are also connected to the four buses 108-1, 108-2, 108-3, 108-4. Specifically, the communications devices 102-1, 102-2 are connected to the bus 108-1, the communications device 102-3 is connected to the bus 108-2, the communications devices 102-4, 102-5 are connected to the bus to 108-3, and the communications device 102-6 is connected to the bus 108-4. The four buses 108-1, 108-2, 108-3, 108-4 are buses in the communications network. The four buses may be any type of physical communications buses. In an embodiment, the four buses are serial communications buses in the communications network. Although the CBG 104 is shown in FIG. 1 as being connected to four buses, in some other embodiments, the CBG 104 is connected to more than four buses or less than four buses. In an embodiment, at least one of the communications devices 102-1, 102-2, 102-3, 102-4, 102-5, 102-6 is directly connected to a bus 108-1, 108-2, 108-3 or 108-4 in the communications network. In other words, at least one of the communications devices is connected to a bus 108-1, 108-2, 108-3 or 108-4 in the communications network without any intermediate device.

The robustness of safety critical communications of an application system such as an automobile system can be improved by connecting communications devices 102-1, 102-2, 102-3, 102-4, 102-5, 102-6 in the application system to the CBG 104. For example, the CBG 104 can block unwanted communications in the automobile system and protect the safety critical communications. However, the CBG 104 itself or the interconnections between the CBG 104 and the communications devices may be faulty. For example, the CBG may contain wrong configuration parameters, wrong communications schedule, or broken interconnection to the communications devices. In another example, the internal circuitry of the CBG 104 may be faulty. When the CBG 104 is faulty, instead of guarding the automobile system against errors, the CBG 104 itself may introduce errors. Thus, erroneous run time behavior of the CBG 104 and the broken connectivity between the CBG 104 and the communications devices needs to be detected to make the automobile system more robust.

In an embodiment, all of the communications devices 102-1, 102-2, 102-3, 102-4, 102-5, 102-6 are communications nodes of a FlexRay™ communications system in accordance to the FlexRay™ communications system specifications developed by the FlexRay™ Consortium. A FlexRay™ communications system is a robust, scalable, deterministic and fault-tolerant serial bus system for automotive applications. In this embodiment, the CBG 104 is connected to a channel of the FlexRay™ communications system to enable data transfer on the channel and to increase fault tolerance. A channel of the FlexRay™ communications system is a single communications medium, e.g., one network. For example, the FlexRay™ communications system specifications distinguish between two independent, parallel communications media, a channel A and a channel B. The CBG 104 may be a FlexRay-compatible CBG, which is designed, developed, manufactured, and/or configured compatibly with or in accordance to the FlexRay™ communications system specifications developed by the FlexRay™ Consortium. When the CBG 104 is used to protect a channel of a FlexRay™ communications system, some critical faults (e.g., short circuited bus lines or erroneous behavior of a communications node) can be tolerated by the FlexRay™ communications system. The CBG 104 can support a given number (e.g., 16) of buses in the communications network 100. In an embodiment, a sub-bus or other communications link/device is connected to a bus in the communications network and communications nodes that perform non-critical applications are connected to the sub-bus or the other communications link/device. For example, a gateway or a bridge can be used to connect the CBG 104 to a Local Interconnect Network (LIN) bus, a Controller Area Network (CAN) bus, or an Ethernet bus, which is connected to external communications devices. The LIN bus is a vehicle bus or a computer networking bus system used within automotive network architectures. The CAN bus is a vehicle bus designed to allow microcontrollers and devices to communicate with each other within a vehicle without a host computer. The number of nodes connected to a sub-bus is not limited by the CBG 104. The architecture and algorithms of the CBG 104 may be independent of the number of buses connected to the CBG 104. In an embodiment, multiple CBGs are cascaded on one channel of a FlexRay™ communications system. For example, if a single CBG is not connected to a sufficient number of buses for a certain FlexRay™ communications system, multiple CBGs can be cascaded on one channel of the FlexRay™ communications system such that a sufficient number of buses are provided.

The CBG 104 is further configured to store a communications schedule of the communications devices 102-1, 102-2, 102-3, 102-4, 102-5, 102-6 and configuration parameters. The communications schedule contains information of scheduled data traffic that goes through the CBG 104. The CBG to 104 selectively blocks and selectively forwards data received on the buses 108-1, 108-2, 108-3, 108-4 connected to the CBG 104 based on the communications schedule and/ or the configuration parameters. The CBG 104 at least stores bus level communications schedule of data communications that goes through the CBG 104. The CBG 104 may not store the complete communications schedule of the communications network 100. However, the CBG 104 may also store more information, e.g., node level communications schedule, of data communications that goes through the CBG 104. In an embodiment, the CBG 104 has information to protect data (e.g., a data frame or data frames) relevant to critical functions and to start up and maintain communications. In an embodiment, if only a subset of the communications devices and messages are used to fulfill a critical function, only the schedule of the subset of the communications devices and messages is stored in the CBG and only the time slot/bus combinations of the subset of the communications devices and messages are protected. A time slot may be a slot in a static segment of a FlexRay-compatible communications cycle or a mini-slot in a dynamic segment of a FlexRay-compatible communications cycle. As a result, a change in a communications device performing a non-critical function will not lead to a change in the communications schedule stored in the CBG 104.

In an embodiment, the CBG 104 is configured to decode data (e.g., a data frame or data frames). The CBG 104 can also filter received data frames. Examples of filtering functions that can be performed by the CBG includes, without limitation, semantic filtering and Byzantine (SOS) filtering. By filtering received data frames, the CBG 104 operates to ensure that certain errors on one bus will not propagate to other buses. Because the CBG 104 is separated from the communications devices 102-1, 102-2, 102-3, 102-4, 102-5, 102-6, errors in the communications devices will not harm the CBG. Data such as a data frame that is identified as faulty by the CBG 104 will be invalidated in such a way that all of the communications devices will detect the data as being faulty. The CBG 104 can prevent the formation of cliques on one channel during startup and normal operation by not-forwarding or invalidating frames which are identified as faulty (e.g., with wrong frame ID or cycle count). The CBG 104 can protect the startup of a FlexRay™ communications system in the presence of faults. In addition, the CBG 104 can significantly enhance the fault tolerance of the FlexRay™ system to especially during startup. For example, the CBG 104 can limit the bandwidth assigned to a certain communications device or bus connected to the CBG 104.

Figure 2:
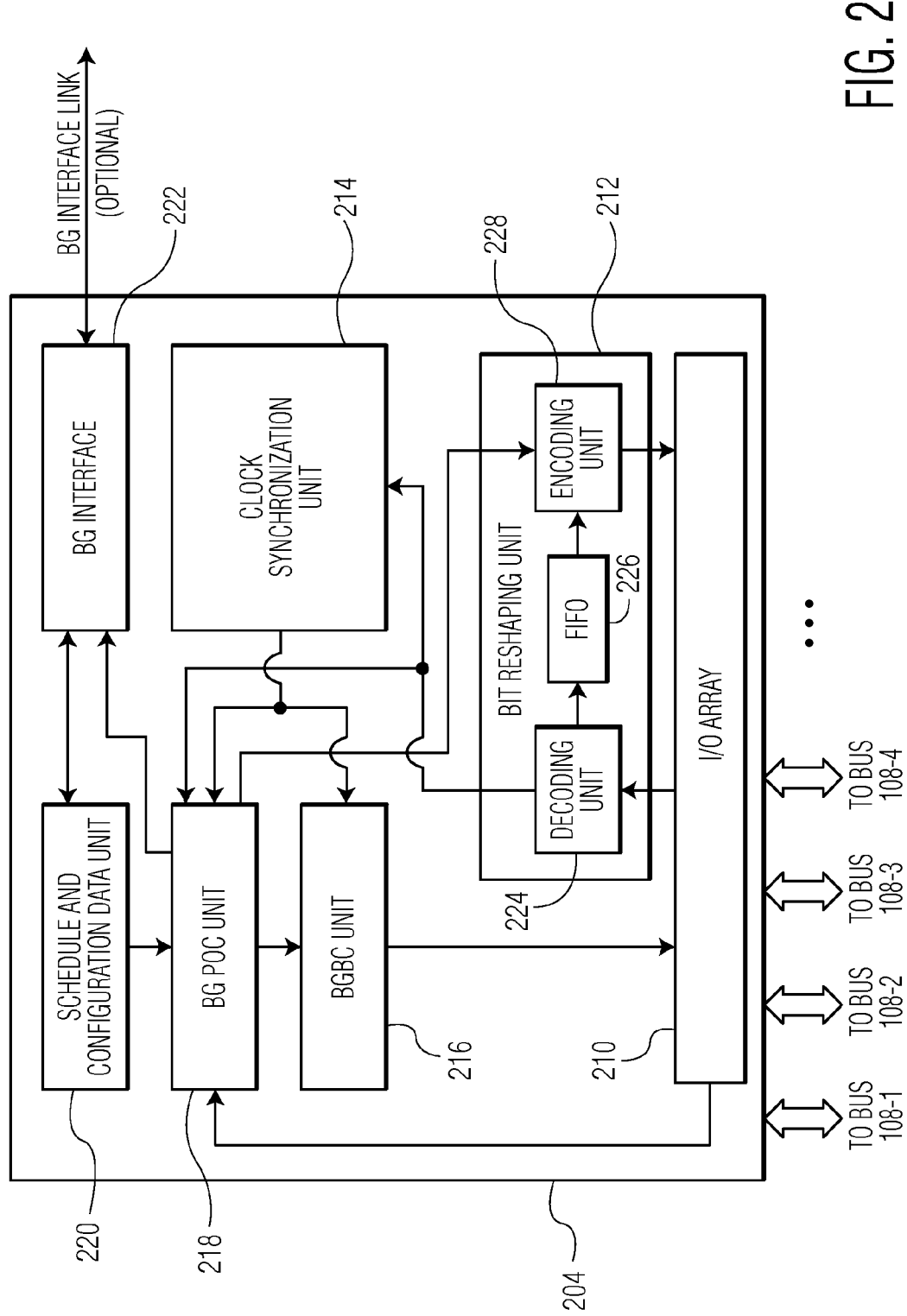
FIG. 2 depicts an embodiment of a CBG depicted in FIG. 1.

FIG. 2 depicts an embodiment of the CBG 104 of FIG. 1. In the embodiment depicted in FIG. 2, a CBG 204 includes an input/output (I/O) array 210, a bit reshaping unit 212, a clock synchronization unit 214, a bus guardian bus control (BGBC) unit 216, a bus guardian (BG) Protocol Operation Control (BG POC) unit 218, a schedule and configuration data unit 220 and a BG Interface 222. The CBG 204 may be a FlexRay-compatible CBG, which is designed, developed, manufactured, and/or configured compatibly with or in accordance to the FlexRay communications system specifications developed by the FlexRay Consortium. The CBG 204 is one of possible implementations of the CBG 104. However, the CBG 104 can be implemented differently from the CBG 204 depicted in FIG. 2. The invention is not restricted to the particular implementation of the CBG 204 depicted in FIG. 2.

The I/O array 210 of the CBG 204 is configured to connect to all of the buses 108-1, 108-2, 108-3, 108-4 connected to the CBG 204. In an embodiment, incoming data (e.g., an incoming data frame) received by the I/O array from one bus connected to the CBG 204 is forwarded to the bit reshaping unit 212 before the incoming data is forwarded to the other buses connected to the CBG 204. If the CBG 204 allows race arbitration (i.e., no schedule based protection of the slots) in which the first incoming data frame from one bus will be delivered to all other buses, during the transmission of the first incoming data frame, no data frame from another bus can be received by the I/O array 210.

The bit reshaping unit 212 of the CBG 204 operates to ensure that, independent of the input signal quality, the output signal delivers the same decoding results for all receiving devices. If the decoded data (e.g., a decoded data frame) is correct, all non-faulty communications devices will receive the correct data. If the decoded data is incorrect, all non-faulty communications devices will receive the incorrect data. In an embodiment, the bit reshaping unit has the capability to invalidate data (e.g., data frames or data symbols) that is identified as faulty or almost faulty. The output stream of the bit reshaping unit is generated using the clock of the CBG 204.

In the embodiment depicted in FIG. 2, the bit reshaping unit 212 includes a decoding unit 224, a First in First out (FIFO) buffer 226 and an encoding unit 228. The decoding unit 224 of the bit reshaping unit 212 is configured to decode received data (e.g., a received data frame) from the I/O array 210 and to deliver the data and relevant timing and status information to the clock synchronization unit 214 and the BG POC unit 218. The status information contains the information on whether data was received, whether a startup or a sync data frame was received, and error information. In an embodiment, the decoding unit verifies the conformance of an incoming bit-stream to the coding rules and the general rules of communications elements. If the decoding unit finds an error in the incoming bitstream, the BG POC unit or other component of the CBG 204 may stop the current relay process and change (e.g., truncate or enlarge) the bit stream to invalidate the bitstream.

The FIFO buffer 226 of the bit reshaping unit 212 is configured to store data (e.g., data bits) that is transferred from the decoding unit 224 to the encoding unit 228. Because the clock of a data sender and the clock of the CBG 204 may run at slightly different speeds, the number of bits stored within the FIFO buffer can increase or decrease during data transmission (e.g., transmission of a data frame). The size of the FIFO buffer typically has to be twice the size that would be required for the nominal delay of the bit reshaping unit due to the possible increase or decrease of stored bits during forwarding of a data frame.

The encoding unit 228 of the bit reshaping unit 212 is configured to encode data and to deliver the encoded data (e.g., bitstream or symbols) to the I/O array 210. In an embodiment, the BG POC overrules data and forces the encoding unit to output an invalidated communications element. Due to possible clock deviations between a data sender and the CBG 204, the bit reshaping unit introduces an additional propagation delay, depending on maximal frame length and maximal relative clock deviation. The propagation delay can be reduced and the FIFO buffer minimized by allowing the encoding unit to compensate the clock speed difference, for example, by slightly varying the length of the high-bit in the byte start sequences of the data frame.

The clock synchronization unit 214 of the CBG 204 is configured to synchronize the CBG 204 to the global time. Errors of the clock synchronization to process are signaled from the clock synchronization unit to the BG POC unit 218. In an embodiment, the clock synchronization unit is basically identical to a clock synchronization unit in one of the communications devices 102-1, 102-2, 102-3, 102-4, 102-5, 102-6.

The BGBC unit 216 of the CBG 204 is configured to enforce a correct transmission schedule by opening the correct buses connected to the CBG 204 for transmission at the correct time. In an embodiment, the BGBC unit operates such that the CBG 204 behaves as an inactive device in which all of the buses are used for input and none of the buses is used to output. In another embodiment, the BGBC unit operates to forward data received from one of the buses to all other buses.

The BG POC unit 218 of the CBG 204 is configured to handle the different states (e.g., startup and normal operation, etc.) of the CBG 204 and the transitions between the different states. In addition, the BG POC unit is also configured to enforce the schedule by sending the appropriate commands to the BGBC unit 216. All detected errors are stored by the BG POC unit and are made available to external devices through the BG Interface 222. The BG POC unit may have filtering capability. For example, if the decoding unit 224 finds an error in the incoming bitstream, the BG POC unit may stop the current relay process and truncate (or enlarge) the communications element to invalidate the communications element.

The schedule and configuration data unit 220 of the CBG 204 is configured to store the communications schedule (or at least the parts that need to be protected) and all necessary configuration data and to makes the stored information available to the BG POC unit 218. The integrity of the communications schedule and configuration data can be protected by an error-detecting code (e.g., a CRC) that is checked periodically. Mismatches between the data and the error-detecting code may cause the CBG 204 to transit into a state in which no communications elements are forwarded or all communications elements are forwarded.

The BG Interface 222 of the CBG 204 is an optional connection device that allows an external computing unit (e.g. a central processing unit (CPU)) to perform certain operations involving the CBG 204. In an embodiment, to the BG Interface is connected to a BG interface link and provides the possibility for an external device to update the communications schedule and configuration data of the CBG 204. The BG interface also allows error messages, status information and configuration data to be read out of the CBG 204.

Turning back to FIG. 1, a test controller 106 can be connected to the communications network 100 to test the communication network to detect a faulty condition associated with the CBG 104 by means of an external diagnosis, rather than an internal diagnosis. An internal diagnosis of the CBG would not cover the interconnect issues and would not show if the required blocking functionalities are indeed working as intended. Compared to the CBG internal diagnosis, checking a faulty condition associated with the CBG by means of an external diagnosis enables an operator to detect the CBG related protocol and physical level errors. In an embodiment, the test controller is connected to the communications network only when the test controller tests the faulty condition associated with the CBG 104. In this embodiment, during the time that the communications network is not being tested, the test controller is not connected to the communications network. Specifically, after the test of the communications network is finished, the test controller is no longer connected to the communications devices 102-1, 102-2, 102-3, 102-4, 102-5, 102-6 and the CBG 104. For example, the test controller can be connected to a vehicle when a communication network in the vehicle is being tested and then be disconnected with the vehicle after the test.

In the embodiment depicted in FIG. 1, the test controller 106 is configured to detect a faulty condition associated with the CBG 104 through the selective blocking and selective forwarding mechanism of the CBG and a number of cooperating nodes in the network, for example 102-1, 102-2, 102-3, 102-4, 102-5, 102-6. For example, the run time behavior of the CBG, the configuration parameters and the communications schedule of the CBG, and the connectivity between the CBG and the communications devices can be checked. The test controller can be operated by a human operator or an operator device. In an embodiment, a human operator initially uses the test controller to program the communications devices 102-1, 102-2, 102-3, 102-4, 102-5, 102-6. Once the communications devices 102-1, 102-2, 102-3, 102-4, 102-5, 102-6 are programmed, the communications devices 102-1, 102-2, 102-3, 102-4, 102-5, to 102-6 can send test data autonomously. The test controller may not be able to determine whether the CBG itself is faulty or the interconnections between the CBG and the communications devices 102-1, 102-2, 102-3, 102-4, 102-5, 102-6 are faulty. In other words, the test controller may not be able to differentiate between a faulty CBG from a faulty interconnection between the CBG and the communications devices 102-1, 102-2, 102-3, 102-4, 102-5, 102-6. However, the test controller can determine a faulty condition associated with the CBG. After a faulty condition associated with the CBG is detected, the test controller can alert the operator device or the human operator to check the CBG and/or the interconnections between the CBG and communications devices in an application system. The operator device or the human operator can fix or remove at least one of the CBG and the interconnections between the CBG and the communications devices in the application system, for example, by correcting configuration parameters and communications schedule of the CBG or fixing any faulty interconnections.

The test controller 106 is configured to supply a communications schedule to the CBG 104, cause test data to be transmitted between different buses 108-1, 108-2, 108-3, 108-4 that are connected to the CBG according to the communications schedule, and determine, decide, or estimate a faulty condition associated with the CBG based on whether or not the test data is received according to the communications schedule. The test data can be in any suitable format. In an embodiment, the test data includes at least one data frame, which includes a header segment, a payload segment, and a trailer segment. The test data may or may not contain any application data. In an embodiment, the communications schedule of the CBG does not specify which communications device on a certain bus should receive a test data frame in a particular time slot. Instead, the communications schedule of the CBG specifies that the test data frame from one bus connected to the CBG should be forward to another bus or some other buses connected to the CBG in a particular time slot. In an embodiment, the diagnosis of the CBG is performed during the slots of the FlexRay static segment, which are time slots of equal lengths and can be referred to as diagnostic slots. In an embodiment, scheduling of diagnostic slots is specified in the CBG. In another embodiment, multiple diagnostic slots can be used to check the connectivity of all the buses 108-1, 108-2, 108-3, 108-4 connected to the CBG. The bandwidth of a diagnostic slot is not completely lost because the payload of a data frame may carry a message between buses. The bus containing communications devices that are not relevant to a diagnostic slot may perform bus-local communications during the diagnostic slot. In addition to the commutations schedule, the test controller may supply communications configuration data, which includes configuration parameters, to the CBG.

In an embodiment, the test controller 106 causes a first communications device 102-1, 102-2, 102-3, 102-4, 102-5 or 102-6 connected to a first bus 108-1, 108-2, 108-3 or 108-4 to transmit test data (e.g., a test data frame) by way of the CBG 104 to a second communications device 102-1, 102-2, 102-3, 102-4, 102-5 or 102-6 connected to a different, second bus 108-1, 108-2, 108-3 or 108-4 in a time slot according to the communications schedule. Because the first and second communications devices are connected to two different buses, the test data must travel through the CBG 104 to reach its destination. In an embodiment, the second communications device may be any communications device that is connected to the second bus. In this embodiment, the communications schedule of the CBG does not specify which communications device on the second bus should receive the test data frame in the time slot. Instead, the communications schedule of the CBG specifies that the test data frame from the first bus should be forwarded to the second bus in the time slot. The test controller determines, decides, or estimates a faulty condition associated with the CBG based on the reception of the test frame. For example, the test controller determines, decides, or estimates there is a fault associated with the CBG if the test data (e.g., the test data frame) is not received by the second communications device in the time slot when the communications schedule instructs the CBG to forward the test data frame to the second bus in the time slot. For example, the test controller determines there is a fault associated with the CBG if the communications schedule instructs the CBG to forward test data to the second communications device 102-1, 102-2, 102-3, 102-4, 102-5 or 102-6 in a time slot and if the test data is not received by the second communications device in the time slot. In another example, the test controller determines there is a fault associated with the CBG if the test data (e.g., the test data frame) is received by the second communications device in the time slot when the communications schedule instructs the CBG not to forward the test data frame to the second bus in the time slot. For example, the test controller determines there is a fault in the CBG if the communications schedule instructs the CBG to block test data to the second communications device 102-1, 102-2, 102-3, 102-4, 102-5 or 102-6 in a time slot and if the test data is received by the second communications device in the time slot.

Signature information, which may carry identification (ID) information of a sender communications device, can be used by a receiving communications device to identify the sender communications device. In an embodiment, the test controller 106 causes a first communications device 102-1, 102-2, 102-3, 102-4, 102-5 or 102-6 connected to a first bus 108-1, 108-2, 108-3 or 108-4 to transmit test data (e.g., a test data frame) by way of the CBG to a second communications device 102-1, 102-2, 102-3, 102-4, 102-5 or 102-6 connected to a second bus 108-1, 108-2, 108-3 or 108-4 in a time slot according to the communications schedule, causes a signature to be included into a payload of the test data frame, and determines the faulty condition associated with the CBG based on whether or not the test data frame is received by the second communications device from the first communications device in the time slot by identifying the signature in the payload of the test data frame. For example, the test controller may cause a first communications device 102-1, 102-2, 102-3, 102-4, 102-5 or 102-6 to include a signature in a payload of a test data frame and to determine a faulty condition associated with the CBG as being faulty by identifying the signature in the payload of the test data. The signature carries identification (ID) information of the first communications device that can be used by a receiving communications device to uniquely identify the first communications device. For example, the CBG may be configured to block a data frame from the communications device 102-1 to the communications device 102-3 in a diagnostic slot. If the diagnostic slot is simply specified as 102-1→102-6, the communications device 102-4 may send a data frame during this slot, and according to the race arbitration policy, the CBG may forward the data frame from the communications device 102-4 to the communications device 102-3. If a sending communications device does not include a signature as part of the to payload, the communications device 102-3 may naively fail to see that the CBG has actually blocked the data frame from the communications device 102-1 just by looking at the payload of the data frame. When a sending communications device includes a signature as part of the payload of a test data frame, the communications device 102-3 can analyze the payload to make a more accurate decision or estimation on the faulty condition associated with the CBG.

Multiple time slots can be used to detect a faulty condition associated with the CBG 104. In an embodiment, the test controller 106 causes a first communications device 102-1, 102-2, 102-3, 102-4, 102-5 or 102-6 connected to a first bus 108-1, 108-2, 108-3 or 108-4 to transmit a first test data (e.g., a first test data frame) by way of the CBG 104 to a second communications device 102-1, 102-2, 102-3, 102-4, 102-5 or 102-6 connected to a different, second bus 108-1, 108-2, 108-3 or 108-4 in a first time slot according to the communications schedule. In addition, the test controller causes the first communications device to transmit a second test data (e.g., a second test data frame) by way of the CBG to the second communications device in a second time slot according to the communications schedule. The test controller determines, decides, or estimates the faulty condition associated with the CBG based on the reception of the first and second test data in the first and second time slots. For example, the test controller determines there is a fault associated with the CBG if the first and second test data frames are received by the second communications device in the first and second time slots, respectively, when the communications schedule instructs the CBG to forward the first test data frame to the second bus in the first time slot and not to forward the second test data frame to the second bus in the second time slot. In another example, the test controller determines a faulty condition if the first and second test data frames are not received by the second communications device in the first and second time slots, respectively, when the communications schedule instructs the CBG to forward the first test data frame to the second bus in the first time slot and not to forward the second test data frame to the second bus in the second time slot. In another example, the test controller determines a faulty condition if the first test data frame is not received by the second communications device in the first time slot and the second test data frame is received by the second communications device in the second time slot when the to communications schedule instructs the CBG to forward the first test data frame to the second bus in the first time slot and not to forward the second test data frame to the second bus in the second time slot.

An example of using multiple time slots to detect a faulty condition associated with the CBG 104 is summarized in Table 1. In the example, a test data frame is sent from bus #1 connected to the CBG.

TABLE 1

An example of using multiple time slots to detect a faulty condition associated with a CBG

| Communications Schedule | Observation | Conclusion/ Estimation |
| --- | --- | --- |
| 1) CBG is scheduled to forward test data frame to Bus #2 in time slot N | 1.1) Bus #2 receives test data frame in time slot N | OK |
| | 1.2) Bus #2 does not receive test data frame in time slot N | Faulty |

TABLE 1-continued

An example of using multiple time slots to detect
a faulty condition associated with a CBG

| Communications Schedule | Observation | Conclusion/ Estimation |
|---|---|---|
| 2) CBG is scheduled to block test data frame to Bus #2 in time slot M | 2.1) Bus #2 receives test data frame in time slot M | Faulty |
| | 2.2) Bus #2 does not receive test data frame in time slot M | OK |

As shown in table 1, the CBG 104 is scheduled to forward a test data frame to bus #2 in time slot N, where N is a positive integer. If bus #2 (e.g., a communications device connected to bus #2) receives the test data frame in time slot N, the test controller 106 concludes or estimates that the CBG is OK. If bus #2 does not receive the test data frame in time slot N, the test controller concludes or estimates that there is a fault associated with the CBG 104. The CBG is scheduled to block a test data frame to bus #2 in time slot M, where M is a positive integer that is different than N. If bus #2 (e.g., a communications device connected to bus #2) receives the test data frame in time slot M, the test controller to 106 concludes or estimates that the CBG is faulty. If bus #2 does not receive the test data frame in time slot M, the test controller concludes or estimates that the CBG is OK.

Figure 3:
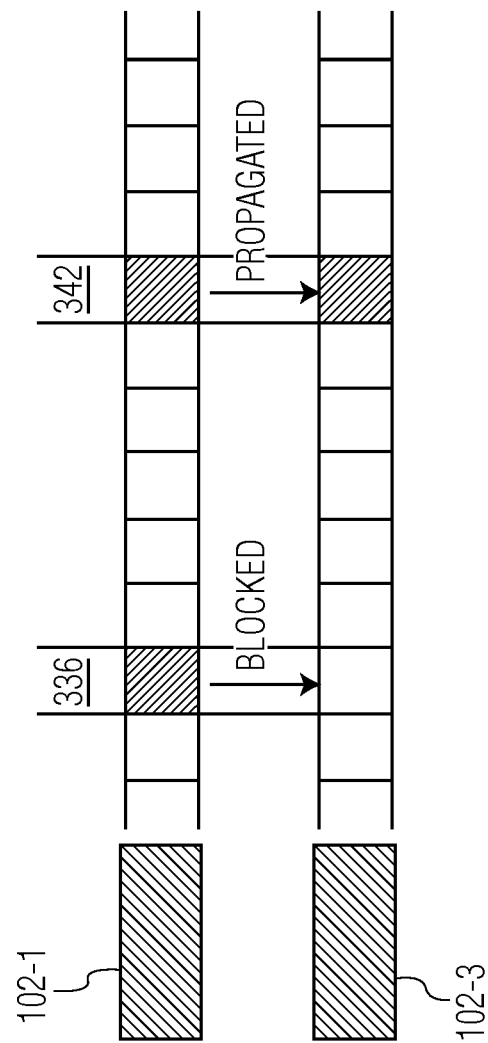
FIG. 3 depicts an exemplary time slot diagram for the communications network depicted in FIG. 1.

FIG. 3 depicts an exemplary time slot diagram for the communications network 100 depicted in FIG. 1 where multiple time slots are used to test a faulty condition associated with a CBG 104. As depicted in FIG. 3, the communications device 102-1 sends a data frame that should be blocked to the communications device 102-3 by the CBG in time slot 336. Later, the communications device 102-1 sends another data frame that should be forwarded to the communications device 102-3 in time slot 342 in the diagnostic slot diagram depicted in FIG. 3. Based on results of the transmission of the two data frames to the communications device 102-3, the test controller 106 decides on the faulty condition associated with the CBG. Data frame transmission from the communications device 102-1 to the communications device 102-3 can be used to check the CBG internal logic and the connectivity between the CBG and the two buses 108-1, 108-2 containing of the communications devices 102-1, 102-3. To check the connectivity towards the other buses connected to the CBG, more diagnostic slots can be used. For example, at least one exchange of data frames between other buses of the CBG can be monitored.

Detecting a faulty condition associated with the CBG 104 can be performed using more than two buses/buses 108-1, 108-2, 108-3, 108-4 connected to the CBG. In an embodiment, the test controller causes a first communications device 102-1, 102-2, 102-3, 102-4, 102-5 or 102-6 connected to a first bus 108-1, 108-2, 108-3 or 108-4 to transmit test data (e.g., a test data frame) by way of the CBG to a second communications device 102-1, 102-2, 102-3, 102-4, 102-5 or 102-6 connected to a second bus 108-1, 108-2, 108-3 or 108-4 and a third communications device 102-1, 102-2, 102-3, 102-4, 102-5 or 102-6 connected to a third bus 108-1, 108-2, 108-3 or 108-4 in a time slot according to the communications schedule. The test controller determines, decides, or estimates the faulty condition associated with the CBG based on the reception of the test data in the time slot. For example, the test controller determines there is a fault associated with the CBG if the test data is received by the second and third communications devices in the time slot when the communications schedule to instructs the CBG to forward the test data to the second bus in the time slot and not to forward the test data to the third bus in the time slot. In another example, the test controller determines there is a fault associated with the CBG if the test data frame is not received by the second and third communications devices in the time slot when the communications schedule instructs the CBG to forward the test data frame to the second bus in the time slot and not to forward the test data frame to the third bus in the time slot. In another example, the test controller determines there is a fault associated with the CBG if the test data frame is not received by the second communications device in the time slot and received by the third communications device in the time slot when the communications schedule instructs the CBG to forward the test data frame to the second bus in the time slot and not to forward the test data frame to the third bus in the time slot. In another embodiment, the test controller causes a first communications device 102-1, 102-2, 102-3, 102-4, 102-5 or 102-6 to transmit test data (e.g., a test data frame) to a third communications device 102-1, 102-2, 102-3, 102-4, 102-5 or 102-6 connected to the CBG in a particular time slot according to the communications schedule and determines or estimates the CBG as being faulty if the communications schedule instructs the CBG to forward the test data to the second and third communications devices in the particular time slot and if the test data is not received by the second communications device in the particular time slot and the test data is received by the third communications device in the particular time slot. The first, second and third communications devices are connected to three different buses that are connected to the CBG. For example, the communications device 102-1 sends a test data frame that should be forwarded to the communications device 102-3, which is specified as follows: 102-1→102-3 according to a communications schedule that is supplied to the CBG by the test controller. In this case, the communications device 102-3 should receive the data frame. If the communications device 102-3 does not receive the data frame, either the CBG has failed to forward the scheduled data frame or the communications device 102-1 has failed to send a scheduled data frame. The latter option can be excluded by specifying the schedule as follows: 102-1→102-3, 102-6. If the communications device 102-6 receives the data frame but the communications device 102-3 does not receive the data frame, a fault within the CBG or the to connectivity between the CBG and the bus 108-2 containing the communications device 102-3 is detected.

Some examples of using more than two buses/buses 108-1, 108-2, 108-3, 108-4 connected to the CBG 104 to detect a faulty condition associated with the CBG is summarized in Table 2. In the example, a test data frame is sent from bus #1 connected to the CBG.

TABLE 2

An example of using more than two buses/buses connected to
a CBG to detect a faulty condition associated with the CBG

| Communications Schedule | Observation | Conclusion/ Estimation |
|---|---|---|
| 1) CBG is scheduled to forward test data frame to Bus #2 and block test data frame to Bus #3 in time slot N | 1.1) Buses #2 and #3 receive test data frame in time slot N | Faulty |
| | 1.2) Bus #2 receives test data frame in time slot N while Bus #3 does not receive test data frame in time slot N | OK |

TABLE 2-continued

An example of using more than two buses/buses connected to a CBG to detect a faulty condition associated with the CBG

| Communications Schedule | Observation | Conclusion/ Estimation |
|---|---|---|
| | 1.3) Bus #2 does not receive test data frame in time slot N while Bus #3 receives test data frame in time slot N | Faulty |
| | 1.4) Buses #2 and #3 do not receive test data frame in time slot N | Faulty |

As shown in table 2, the CBG 104 is scheduled to forward a test data frame to buses #2 and block the data to #3 in time slot N, where N is a positive integer. If buses #2 and #3 (e.g., communications devices connected to buses #2 and #3) receive the test data frame in time slot N, the test controller 106 concludes or estimates that the CBG is faulty. If bus #2 receives the test data frame in time slot N while bus #3 does not receive the test data frame in time slot N, the test controller concludes or estimates that the CBG is OK. If bus #2 does not receive the test data frame in time slot N while bus #3 receives the test data frame in time to slot N, the test controller concludes or estimates that the CBG is faulty. If buses #2 and #3 (e.g., communications devices connected to buses #2 and #3) do not receive the test data frame in time slot N, the test controller 106 concludes or estimates that there is a fault associate with the CBG, which is located in either the CBG itself or the buses connected to the CBG.

In an embodiment, the communications schedule instructs the CBG 104 to forward first test data (e.g., a first test data frame) received from a first communications device 102-1, 102-2, 102-3, 102-4, 102-5 or 102-6 to a second communications device 102-1, 102-2, 102-3, 102-4, 102-5 or 102-6 in a first time slot and to forward second test data (e.g., a second test data frame) from the first communications device to a third communications device 102-1, 102-2, 102-3, 102-4, 102-5 or 102-6 in a second time slot. The first, second and third to communications devices are connected to different buses/buses 108-1, 108-2, 108-3, 108-4 that are connected to the CBG 104. The communications schedule and/or configuration parameters in the CBG configure the CBG to block data to the third communications device in the first time slot and to forward data to the third communications device in the second time slot. The test controller determines the CBG as being faulty if the first test data is received by the third communications device in the first time slot. In addition, the test controller determines the CBG as being faulty or corresponding buses 108-1, 108-2, 108-3, 108-4 as being broken if the second test data is not received by the third communications device in the second time slot. For example, the communications device 102-1 sends a data frame that should not be forwarded to the communications device 102-3. The communications schedule of the CBG may specify that the bus 108-1 containing the communications device 102-1 sends a data frame to the bus 108-4 containing the communications device 102-6, which is symbolized as 102-1→102-6. According to the configuration parameters of the CBG, the data frame from the communications device 102-1 to the communications device 102-6 has to be blocked from being forwarded to the bus 108-2 containing the communications device 102-3. If the communications device 102-3 receives the data frame, the test controller decides that the CBG has failed to block the data frame.

FIG. 4 is a process flow diagram of a method for testing a communications network having a CBG to detect a faulty condition associated with the CBG in accordance with an embodiment of the invention. The CBG may be similar to or same as the CBGs 104, 204 depicted in FIGS. 1 and 2. At block 402, a communications schedule is supplied to the CBG. At block 404, test data is caused to be transmitted between different buses that are connected to the CBG according to the communications schedule. At block 406, the faulty condition associated with the CBG is determined based on whether or not the test data is received according to the communications schedule.

The various components or units of the embodiments that have been described or depicted (e.g., the test controller 106 and the communications device 102-1, 102-2, 102-3, 102-4, 102-5, 102-6) may be implemented in hardware, software that is stored in a non-transitory computer readable medium or a combination of hardware and software that is stored in a non-transitory computer readable medium. The non-transitory computer readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and a Blu-ray disk. Furthermore, the various components or units of the embodiments (e.g., the test controller 106 and the communications device 102-1, 102-2, 102-3, 102-4, 102-5, 102-6) that have been described or depicted may be implemented in a processing device such as a processor, which may include a multifunction processor and/or an application-specific processor.

FIG. 5 depicts an embodiment of the test controller 106. However, the test controller is not limited to the embodiment illustrated in FIG. 5. In the embodiment depicted in FIG. 5, a test controller 500 includes a processing unit 502, memory 504, and a communications interface 506. The processing unit may include any processing device, such as a microcontroller or a processor. For example, the processing unit may include a multifunction processor and/or an application-specific processor. Examples of processors include the PowerPC™ family of processors by IBM and the x86 family of processors by Intel. Although some examples of processors are described herein, the processing unit is not limited to processors, and may instead be implemented as application specific circuitry. The memory within the test controller 500 may include, for example, storage medium such as read only memory (ROM), flash memory, RAM, and a large capacity permanent storage device such as a hard disk drive. The communications interface enables communications with other devices, such as CBG 104 and communication devices 102-1, 102-2, 102-3, 102-4, 102-5, 102-6, via a suitable communications protocol. The test controller 500 may execute computer readable instructions stored in the storage medium to implement various tasks as described above.

Although the operations of the method herein are shown and to described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for testing a communications network having a central bus guardian (CBG) to detect a faulty condition associated with the CBG, the method comprising:
   supplying a communications schedule to the CBG;
   causing test data to be transmitted between different buses that are connected to the CBG according to the communications schedule; and
   determining the faulty condition associated with the CBG based on whether or not the test data is received according to the communications schedule,
   wherein causing the test data to be transmitted comprises causing a first communications device connected to a first bus of the different buses to transmit a test data frame by way of the CBG to a second communications device connected to a second bus of the different buses in a time slot according to the communications schedule, and
   wherein determining the faulty condition associated with the CBG comprises determining there is a fault associated with the CBG if the test data frame is not received by the second communications device in the time slot when the communications schedule instructs the CBG to forward the test data frame to the second bus in the time slot or if the test data frame is received by the second communications device in the time slot when the communications schedule instructs the CBG not to forward the test data frame to the second bus in the time slot.

2. The method of claim 1 further comprising causing a signature to be included into a payload of the test data frame, wherein determining the faulty condition associated with the CBG comprises determining the faulty condition associated with the CBG based on whether or not the test data frame is received by the second communications device from the first communications device in the time slot by identifying the signature in the payload of the test data frame.

3. The method of claim 1, wherein causing the test data to be transmitted comprises:
   causing a third communications device connected to a third bus of the different buses to transmit a first test data frame by way of the CBG to fourth communications device connected to a fourth bus of the different buses in a first time slot according to the communications schedule; and
   causing the third communications device to transmit a second test data frame by way of the CBG to the fourth communications device in a second time slot according to the communications schedule.

4. The method of claim 3, wherein determining the faulty condition associated with the CBG comprises determining there is a fault associated with the CBG if the first and second test data frames are received by the fourth communications device in the first and second time slots, respectively, when the communications schedule instructs the CBG to forward the first test data frame to the fourth bus in the first time slot and not to forward the second test data frame to the fourth bus in the second time slot.

5. The method of claim 3, wherein determining the faulty condition associated with the CBG comprises determining there is a fault associated with the CBG if the first and second test data frames are not received by the fourth communications device in the first and second time slots, respectively, when the communications schedule instructs the CBG to forward the first test data frame to the fourth bus in the first time slot and not to forward the second test data frame to the fourth bus in the second time slot.

6. The method of claim 3, wherein determining the faulty condition associated with the CBG comprises determining there is a fault associated with the CBG if the first test data frame is not received by the fourth communications device in the first time slot and the second test data frame is received by the fourth communications device in the second time slot when the communications schedule instructs the CBG to forward the first test data frame to the fourth bus in the first time slot and not to forward the second test data frame to the fourth bus in the second time slot.

7. The method of claim 1, wherein causing the test data to be transmitted comprises causing a third communications device connected to a third bus of the different buses to transmit a test data frame by way of the CBG to a fourth communications device connected to a fourth bus of the different buses and a fifth communications device connected to a fifth bus of the different buses in a time slot according to the communications schedule.

8. The method of claim 7, wherein determining the faulty condition associated with the CBG comprises determining there is a fault associated with the CBG if the test data frame is received by the fourth and fifth communications devices in the time slot when the communications schedule instructs the CBG to forward the test data frame to the fourth bus in the time slot and not to forward the test data frame to the fifth bus in the time slot.

9. The method of claim 7, wherein determining the faulty condition associated with the CBG comprises determining there is a fault associated with the CBG if the test data frame is not received by the fourth and fifth communications devices in the time slot when the communications schedule instructs the CBG to forward the test data frame to the fourth bus in the time slot and not to forward the test data frame to the fifth bus in the time slot.

10. The method of claim 7, wherein determining the faulty condition associated with the CBG comprises determining there is a fault associated with the CBG if the test data frame is not received by the fourth communications device in the time slot and received by the fifth communications device in the time slot when the communications schedule instructs the CBG to forward the test data frame to the fourth bus in the time slot and not to forward the test data frame to the fifth bus in the time slot.

11. A system for testing a communications network having a central bus guardian (CBG) to detect a faulty condition associated with the CBG, the system comprising:
   a test controller configured to:
      supply a communications schedule to the CBG;
      cause test data to be transmitted between different buses that are connected to the CBG according to the communications schedule; and
      determine the faulty condition associated with the CBG based on whether or not the test data is received according to the communications schedule,
   wherein the test controller is further configured to:
      cause a first communications device connected to a first bus of the different buses to transmit a test data frame by way of the CBG to a second communications device connected to a second bus of the different buses in a time slot according to the communications schedule; and determine there is a fault associated with the CBG if the test data frame is not received by the second communications device in the time slot when the communications schedule instructs the CBG to forward the test data frame to the second bus in the time slot, or if the test data frame is received by the second communications device in the time slot when the communications schedule instructs the CBG not to forward the test data frame to the second bus in the time slot.

12. The system of claim 11, wherein the test controller is further configured to:

cause a third communications device connected to a third bus of the different buses to transmit a test data frame by way of the CBG to a fourth communications device connected to a fourth bus of the different buses in a time slot according to the communications schedule;

cause a signature to be included into a payload of the test data frame; and determine the faulty condition associated with the CBG based on whether or not the test data frame is received by the fourth communications device from the third communications device in the time slot by identifying the signature in the payload of the test data frame.

13. The system of claim 11, wherein the test controller is further configured to:

cause a third communications device connected to a third bus of the different buses to transmit a first test data frame by way of the CBG to a fourth communications device connected to a fourth bus of the different buses in a first time slot according to the communications schedule;

cause the third communications device to transmit a second test data frame by way of the CBG to the fourth communications device in a second time slot according to the communications schedule; and determine there is a fault associated with the CBG if the first and second test data frames are received by the fourth communications device in the first and second time slots, respectively, when the communications schedule instructs the CBG to forward the first test data frame to the fourth bus in the first time slot and not to forward the second test data frame to the fourth bus in the second time slot, if the first and second test data frames are not received by the fourth communications device in the first and second time slots, respectively, when the communications schedule instructs the CBG to forward the first test data frame to the fourth bus in the first time slot and not to forward the second test data frame to the fourth bus in the second time slot, or if the first test data frame is not received by the fourth communications device in the first time slot and the second test data frame is received by the fourth communications device in the second time slot when the communications schedule instructs the CBG to forward the first test data frame to the fourth bus in the first time slot and not to forward the second test data frame to the fourth bus in the second time slot.

14. The system of claim 11, wherein the test controller is further configured to:

cause a third communications device connected to a third bus of the different buses to transmit a test data frame by way of the CBG to a fourth communications device connected to a fourth bus of the different buses and a fifth communications device connected to a fifth bus of the different buses in a time slot according to the communications schedule; and determine there is a fault associated with the CBG if the test data frame is received by the fourth and fifth communications devices in the time slot when the communications schedule instructs the CBG to forward the test data frame to the fourth bus in the time slot and not to forward the test data frame to the fifth bus in the time slot, if the test data frame is not received by the fourth and fifth communications devices in the time slot when the communications schedule instructs the CBG to forward the test data frame to the fourth bus in the time slot and not to forward the test data frame to the fifth bus in the time slot, or if the test data frame is not received by the fourth communications device in the time slot and received by the fifth communications device in the time slot when the communications schedule instructs the CBG to forward the test data frame to the fourth bus in the time slot and not to forward the test data frame to the fifth bus in the time slot.

15. A method for testing a communications network having a central bus guardian (CBG) to detect a faulty condition associated with the CBG, the method comprising:

supplying a communications schedule to the CBG;

causing test data to be transmitted between different buses that are connected to the CBG according to the communications schedule; and determining the faulty condition associated with the CBG based on whether or not the test data is received according to the communications schedule, wherein causing the test data to be transmitted comprises causing a first communications device connected to a first bus of the different buses to transmit a test data frame by way of the CBG to a second communications device connected to a second bus of the different buses in a time slot according to the communications schedule, the method further comprising causing a signature to be included into a payload of the test data frame, wherein determining the faulty condition associated with the CBG comprises determining the faulty condition associated with the CBG based on whether or not the test data frame is received by the second communications device from the first communications device in the time slot by identifying the signature in the payload of the test data frame.

16. The method of claim 15, wherein causing the test data to be transmitted comprises:

causing a third communications device connected to a third bus of the different buses to transmit a first test data frame by way of the CBG to a fourth communications device connected to a fourth bus of the different buses in a first time slot according to the communications schedule; and causing the third communications device to transmit a second test data frame by way of the CBG to the fourth communications device in a second time slot according to the communications schedule.

17. The method of claim 16, wherein determining the faulty condition associated with the CBG comprises determining there is a fault associated with the CBG if the first and second test data frames are received by the fourth communications device in the first and second time slots, respectively, when the communications schedule instructs the CBG to forward the first test data frame to the fourth bus in the first time slot and not to forward the second test data frame to the fourth bus in the second time slot.

18. The method of claim 15, wherein causing the test data to be transmitted comprises causing a third communications device connected to a third bus of the different buses to transmit a test data frame by way of the CBG to a fourth communications device connected to a fourth bus of the different buses and a fifth communications device connected to a fifth bus of the different buses in a time slot according to the communications schedule.

\* \* \* \* \*